United States Patent [19]
Bahr et al.

[11] Patent Number: 5,436,545
[45] Date of Patent: Jul. 25, 1995

[54] SYSTEM FOR ACCURATELY MEASURING CURRENT IN PWM AMPLIFIER DRIVEN LOADS

[75] Inventors: Allen A. Bahr; Tony R. Larson, both of Tucson, Ariz.

[73] Assignee: International Business Machines Corporation, Armonk, N.Y.

[21] Appl. No.: 321,663

[22] Filed: Oct. 12, 1994

Related U.S. Application Data

[63] Continuation of Ser. No. 992,190, Dec. 17, 1992, abandoned.

[51] Int. Cl.$^6$ ............................................. H02P 7/00
[52] U.S. Cl. ........................................ 318/727; 318/811
[58] Field of Search ............................... 318/798–825, 318/685, 696, 254, 431, 138, 727, 632; 363/40, 41

[56] References Cited

U.S. PATENT DOCUMENTS

| | | | |
|---|---|---|---|
| 4,186,334 | 1/1980 | Hirata et al. | 318/805 |
| 4,249,120 | 2/1981 | Earle | 318/805 X |
| 4,322,671 | 3/1982 | Kawada et al. | 318/811 X |
| 4,496,886 | 1/1985 | Gordon et al. | 318/254 |
| 4,599,549 | 7/1986 | Mutoh et al. | 318/798 |
| 4,611,157 | 9/1986 | Miller et al. | 318/696 |
| 4,642,543 | 2/1987 | MacMinn | 318/696 |
| 4,926,105 | 5/1990 | Mischenko et al. | 318/800 |
| 5,223,775 | 6/1993 | Mongeau | 318/432 |
| 5,247,237 | 9/1993 | Koyama et al. | 318/808 |

Primary Examiner—Jonathan Wysocki
Attorney, Agent, or Firm—Benman, Collins & Sawyer

[57] ABSTRACT

A system for accurately measuring current drawn intermittently by an inductive load over a time interval T including a first and a second time subinterval during which the load is in state S1 and state S2 respectively and drawing current and a third time subinterval during which the load is in state S3, an idle state, and drawing substantially zero current is provided. In a preferred embodiment, the current measuring system includes a pilot current detection circuit having a pulse width modulator which generates a $\frac{1}{2}T_1$ timing signal representing the average amplitude of the current drawn by the load while in states S1 and S2. A correction circuit generates a logic signal that indicates the time of transition of the inductive load from state S2 to state S3 and from state S3 to state S1. The logic signal is used to clock a first sample and hold circuit to provide a scaling factor utilized to correct the average load current. Thereafter, the average load current and the scaling factor are combined in a multiplier to provide a scaled average load current to control the inductive load.

22 Claims, 6 Drawing Sheets

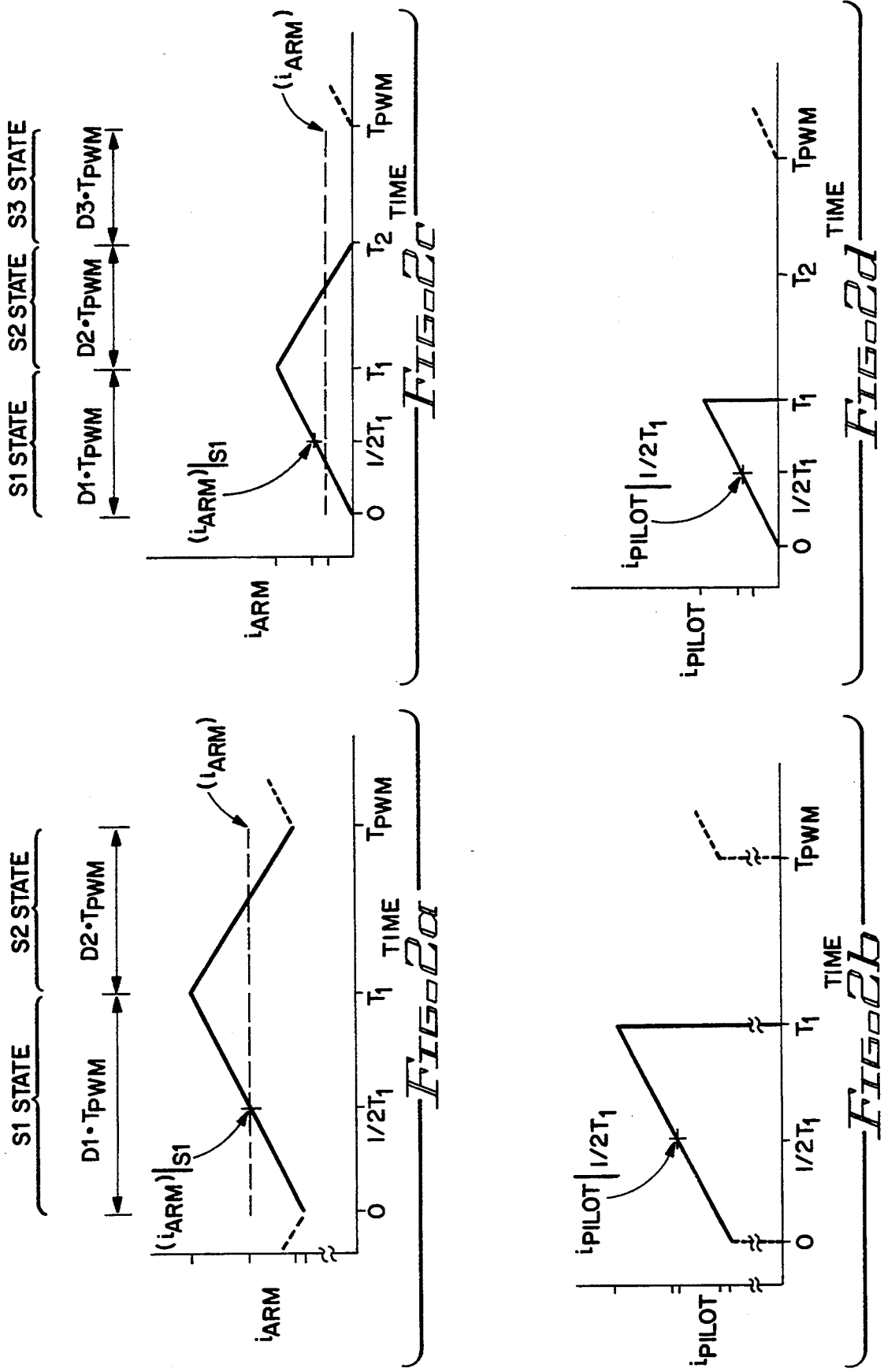

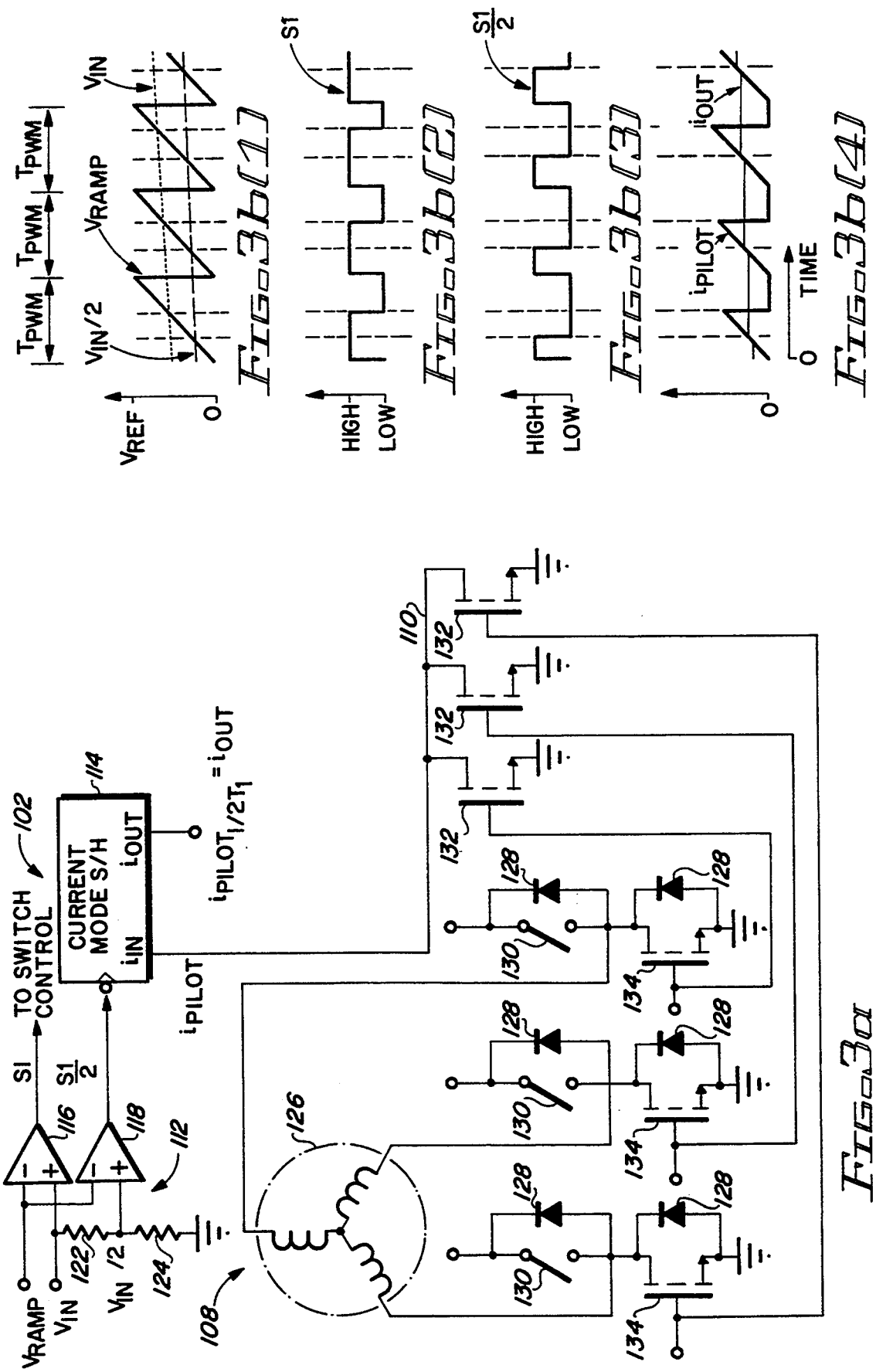

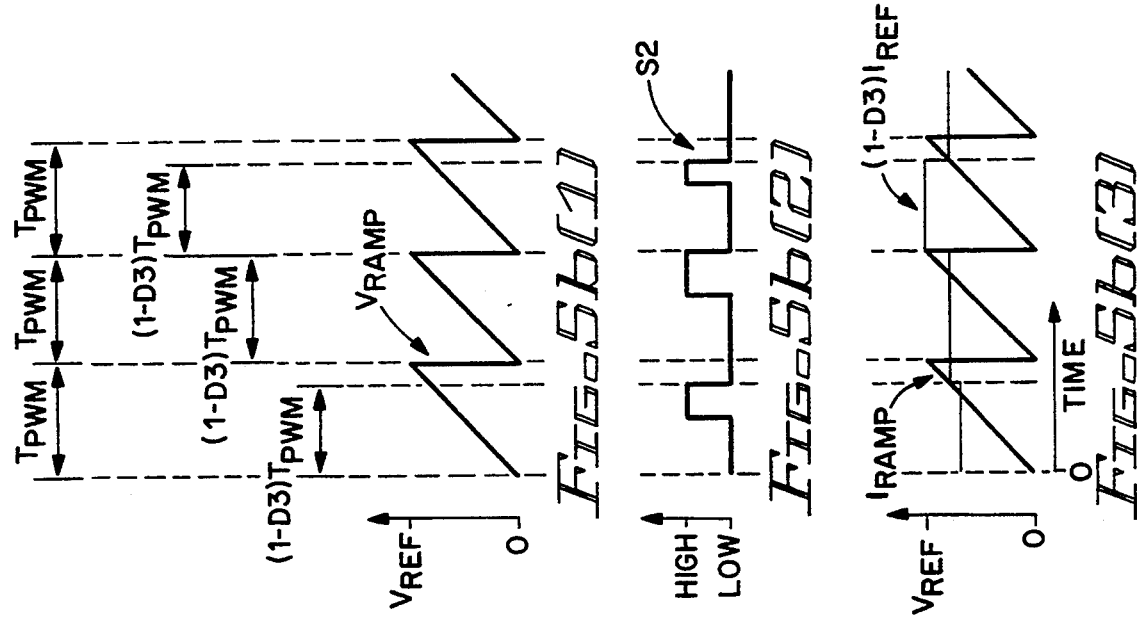
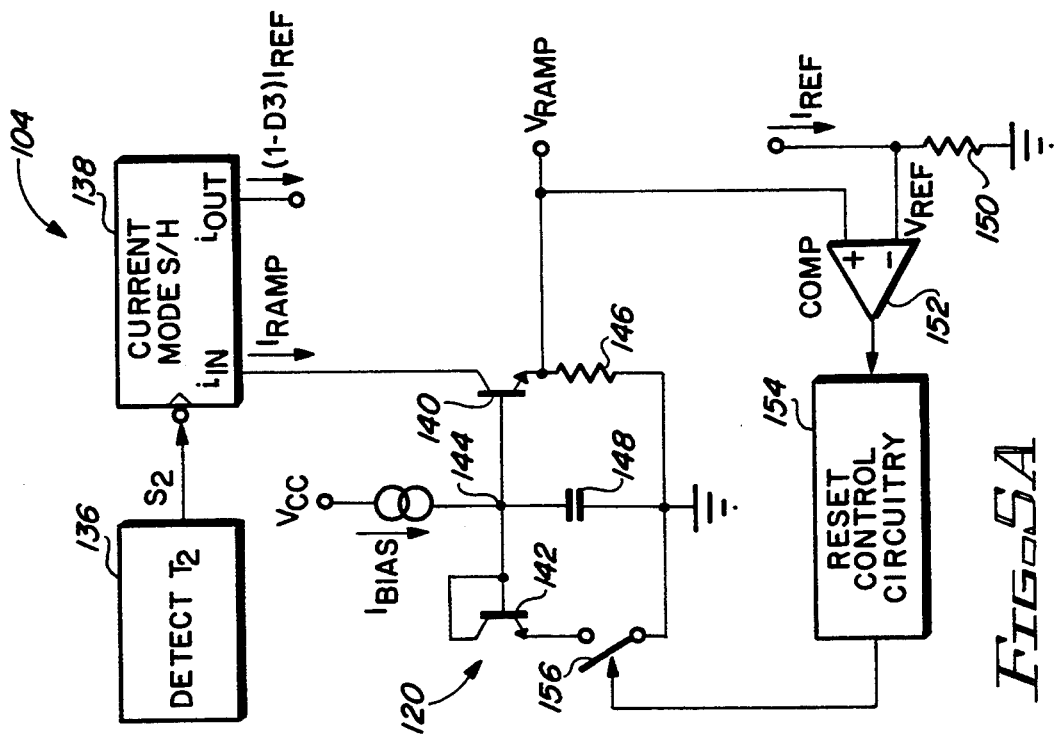

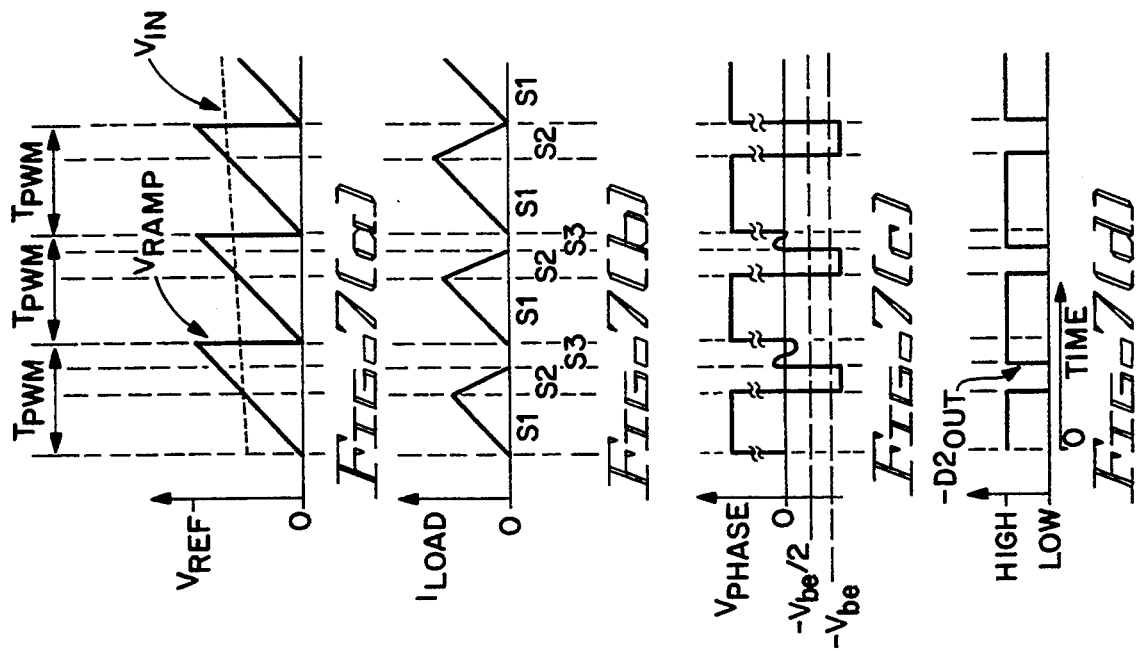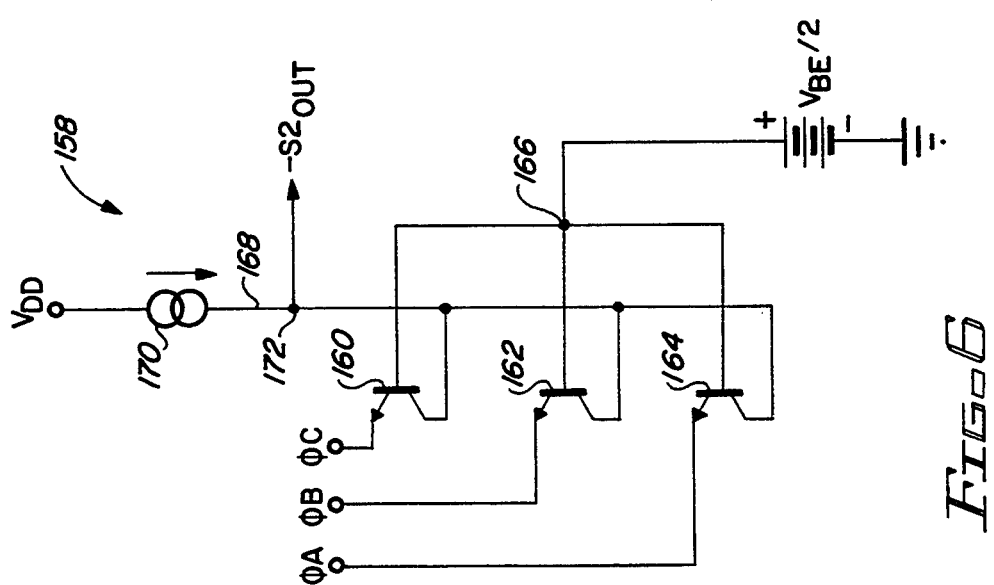

SYSTEM FOR ACCURATELY MEASURING CURRENT IN PWM AMPLIFIER DRIVEN LOADS

This is a Continuation of application Ser. No. 07/992,190, filed Dec. 17, 1992 now abandoned.

BACKGROUND OF THE INVENTION

1. Field of the Invention

The present invention relates to current measuring systems and techniques. More specifically, the present invention relates to systems and techniques for accurately measuring current in Pulse Width Modulated (PWM) amplifier driven inductive loads.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

The torque of a three-phase brushless motor employed to drive a load must be accurately controlled in order to precisely position the load. The torque of the motor is a direct function of the current in the motor armature windings. Therefore, the motor armature current must be accurately measured and controlled in order to control the torque of the motor.

The three-phase brushless motor can be utilized to drive, for example, the reels of a tape drive system and can include three separate wye-connected inductive windings. A three-phase full bridge power amplifier directs current through the motor by pulse width modulating (PWM) switches that impress supply rail voltage across the appropriate armature terminals. Each PWM switch is connected across a flyback diode which provides a path for armature current when no path is provided by the switches. By closing the appropriate combination of switches across the diodes as is known in the art, the amplifier can provide current flow in any direction under all possible phase combinations.

The three-phase full bridge power amplifier can operate in either the continuous conduction mode (CCM) or the discontinuous conduction mode (DCM) of operation. In the CCM, two unique conduction states (S1, S2) exist during each PWM cycle for the amplifier to toggle between. However, a third "idle" state (S3) exists in the PWM cycle during the DCM of operation. State S1 exists at the beginning of each PWM cycle when the switches connect the armature windings across the power supply rails. Armature current increases nearly linearly during state S1.

State S2 is initiated when all PWM switches are open circuited. The armature inductance forces current to continue to flow through the windings in the same direction during state S2. Since the PWM switches are open circuited, the only available current path is from electrical ground through the flyback diode network, the armature inductor and back to the power supply rails. Armature current decreases nearly linearly with time usually at a faster rate than it increased during state S1. Other more sophisticated power amplifiers intended to operate in CCM only, bypass the flyback diodes by switching on appropriate power Field Effect Transistors (FET's) to conduct in the reverse direction during state S2. This design reduces power loss to the diode forward voltage drop.

The idle state S3 begins only if the armature current has decayed all the way to zero during state S2. The switches remain open until the end of the PWM period and no current flows in the circuit until the beginning of the next PWM cycle. The armature current is discontinuous which defines DCM operation. At high armature current and wide pulse width, state S3 may never exist. The next PWM cycle starts before armature current decays all the way to zero. The beginning of the next cycle places the PWM amplifier back into state S1. Thus, the armature current begins to rise again before it ever decays to zero. This condition defines the CCM of operation as the armature current is continuously present throughout the entire PWM cycle. In CCM operation, the PWM amplifier is never idle since it only toggles between states S1 and S2. However, in DCM operation, armature current does reach zero and the PWM amplifier cycles through each of the three states every PWM cycle.

In graphical illustrations known in the art, state S1 appears as a ramp-up function and state S2 appears as a ramp-down function. Current does not flow in state S3. The duty cycle or fraction of time that the PWM amplifier operates in states S1, S2 and S3 is represented by D1, D2 and D3, respectively. The armature current, defined as a positive value, can decay to zero but cannot change polarity during any single PWM cycle. However, power supply current does alternate during a PWM cycle. The power supply current is positive during state S1 and negative during state S2 when the motor returns power to the power supply rails.

In order to control the motor torque, the armature current must be sensed. Known systems and techniques to sense the motor armature current include sense resistor circuits and pilot sensing circuits.

Sense resistor circuits are typically utilized in applications which require accurate current measurements. In sense resistor circuits, sense resistors are placed in the armature current carrying path of the PWM amplifier. The sense resistors produce voltage signals proportional to armature current. The voltage signals, when amplified and conditioned, represent armature current to the system. The sense resistor current changes polarity between states S1 and S2 just as the supply current changes polarity. To obtain average current throughout a full PWM cycle, a switching network or dual sense resistor configuration is required. Therefore, pairs of sensing resistors are used to individually connect the PWM switches and the flyback resistors to ground. The sense resistor tied to the switch carries armature current during state S1 while the sense resistor tied to the flyback diodes carries armature current during state S2. The voltage drops generated across the two sense resistors are summed algebraically and averaged over the total PWM cycle. An integrating operational amplifier circuit is often utilized to perform this function.

Sense resistor circuits have certain characteristics that limit their use in integrated motor amplifier circuits. For example, relatively high power is dissipated in the sense resistors which is incompatible with integrated circuit (IC) design. High power dissipating elements are to be avoided in IC design to minimize damage to the circuitry. When necessary, they are best implemented off-chip. However, off-chip sense resistors require additional high current input/output pins on the IC which is also undesirable. The transition of current from one sense resistor to another is nearly instantaneous between states S1 and S2. The lead and body inductance of off-chip sense resistors creates damaging voltage transients when driven by rapid transitions in current.

Integrating the voltage transients that occur across the inductive sense resistors adds error to the output signal. The onset of states S1 and S2 causes inductive voltage spikes to occur across the sense resistors. The voltage-time product of these inductive voltage spikes adds to the perceived armature current even though the voltages do not represent actual current through the sense resistor. Even non-inductive resistors suffer from error producing transient effects. The capacitance of the lower switch FET's gate carries displacement current. Switching the FET on or off causes gate-source current spikes to pass through the sense resistor. This gate-source current does not represent motor armature current. Susceptibility to this offset error increases with PWM frequency, power FET capacitance and low armature current.

Sense resistor signals with their attendant sharp transients require high bandwidth operational amplifiers for accurate signal processing. Intelligent power IC technologies do not provide high gain-bandwidth operational amplifiers. Besides the gain-bandwidth requirements, operational amplifiers must process both positive and negative going signals from the sense resistors. This requirement necessitates dual power supply rails that increase system cost and complexity.

Pilot sensing circuits are also known as a means to sense motor armature current which is then used to control motor torque. Conventional pilot sensing circuits are employed in applications to detect peak current. Pilot sensing circuits are often used to measure current through PWM switches. As is known in the art, a pilot circuit is a miniature copy of a PWM switch that produces a scaled down replica of the switch current. Therefore, conventional pilot circuits are useful to detect load overcurrent conditions in the armature windings. In a conventional pilot sensing circuit, the output signal indicates whether the sum of the currents through the pilot circuits exceeds a threshold value.

Conventional pilot sensing circuits also have certain characteristics that limit their use in integrated motor amplifier circuits. For example, errors in pilot circuit currents arise from technology, circuit and application effects. Many IC power technologies do not support accurate power device scaling. Further, scaled pilot circuits have built-in errors due to geometrical effects. Even accurately scaled pilot sensing circuits suffer errors due to terminal voltage differences. Ideal pilot circuits produce accurate current outputs only when the voltage bias at all corresponding terminals of the PWM switch and pilot circuits are identical. Conventional pilot circuit configurations violate this condition for at least one terminal. Advances in pilot sensing circuit design have addressed these problems.

Another problem is that conventional pilot sensing circuits are not accurate for average current measurements. The PWM switches and the associated pilot sensing circuits conduct current only during state S1. Thus, when the PWM switches are open circuited during states S2 and S3, current does not flow through the pilot circuits. Average armature current must account for the entire PWM cycle. However, pilot sensing circuits provide an output signal only during a portion of the PWM cycle. Thus, integration of the pilot current alone ignores states S2 and S3 and cannot accurately reflect the average armature current.

Hence, a need remains in the art for a system and technique that compensates for the idle state S3 during DCM operation of the PWM amplifier which will ensure the measurement of true average motor armature current.

SUMMARY OF THE INVENTION

The need in the art is addressed by the system for accurately measuring current in PWM amplifier driven loads of the present invention. The invention includes a first mechanism for sensing current across an inductive load during a time interval T and providing a first signal in response thereto, a second mechanism for providing a second signal representing a scaling factor and a third mechanism for combining the first signal with the second signal to generate a third signal representing the current through the inductive load.

In a preferred embodiment, the current measuring system includes a pilot current detection circuit having a pulse width modulator which generates a $\frac{1}{2}$S1 signal utilized to clock a first sample and hold circuit. The first sample and hold circuit samples a pilot current of the PWM driven inductive load for detecting an average load current over a cycle at the midpoint of a first conduction state of a PWM amplifier. A correction circuit generates a logic signal that indicates the time of transition of the PWM amplifier from a second conduction state to an idle state. The logic signal is used to clock a second sample and hold circuit to provide the scaling factor utilized to correct the average load current. Thereafter, the average load current and the scaling factor are combined in a multiplier to provide a scaled average load current to control the PWM driven inductive load.

BRIEF DESCRIPTION OF THE DRAWINGS

FIGS. 2a –2d are a graph showing plots of typical armature current and pilot current versus time in an inductor connected across a switch-mode power amplifier for both continuous conduction mode and discontinuous conduction mode of operation.

FIG. 3a is a schematic diagram of the pilot current detection circuit of FIG. 1 for measuring the average current in an inductor during the continuous conduction mode of operation.

FIGS. 3b(1)–3b(4) are a timing diagram showing the timing relationships between the various parameters associated with the pilot current detection circuit of FIG. 3a.

FIG. 4 is a schematic diagram of a pilot sensing circuit employed in the pilot current detection circuit of FIG. 3a.

FIG. 5a is a more comprehensive diagram, partly in block and partly in schematic, of the correction circuit of FIG. 1 showing detail of a ramp generator.

FIGS. 5b(1)–5b(3) are a timing diagram showing the timing relationships between the various parameters associated with the correction circuit of FIG. 5a.

FIG. 6 is a schematic diagram of a flyback detection circuit of the current measuring system of FIG. 1 showing a plurality of transistors monitoring a plurality of inductor terminals.

FIGS. 7a–7d are a timing diagram showing the timing relationships between the various parameters associated with the flyback detection circuit of FIG. 6.

DESCRIPTION OF THE INVENTION

Illustrative embodiments and exemplary applications will now be described with reference to the accompanying drawings to disclose the advantageous teachings of the present invention.

Figure 1:
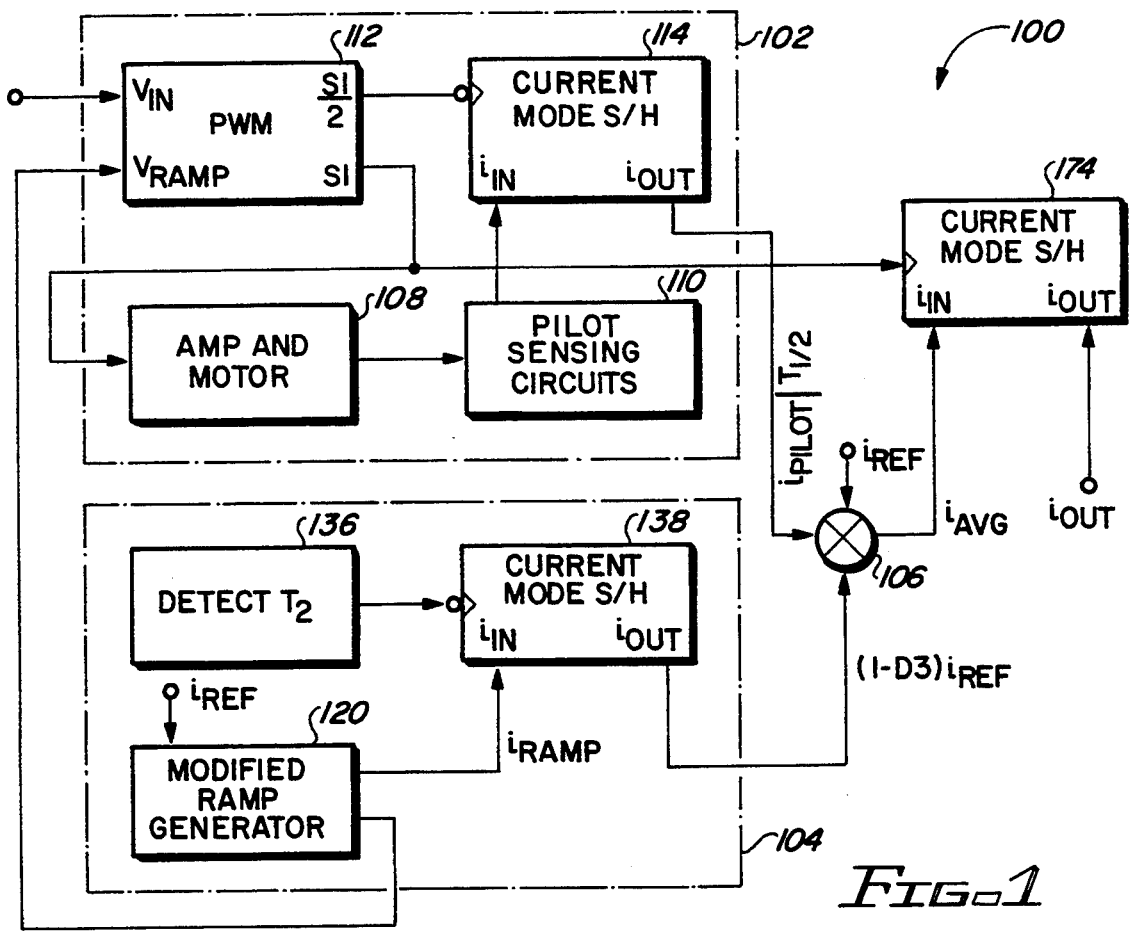
FIG. 1 is a block diagram of the current measuring system of the present invention showing a pilot current detection circuit and a correction circuit for measuring the average current in an inductor during both the continuous conduction mode and the discontinuous conduction mode of operation.

The invention is a system 100 for accurately measuring current in pulse width modulated (PWM) amplifier driven loads as shown in FIG. 1. The current measuring system 100 includes a pilot current detection circuit 102, a correction circuit 104 and a multiplier circuit 106. The pilot current detection circuit 102 includes a motor and amplifier 108, pilot sensing circuits 110, a pulse-width modulator 112 and a first current mode sample and hold circuit 114. The function of the pilot current detection circuit 102 is to sense the average armature current during the current conducting phase versus the nonconducting phase of motor operation.

The Continuous Conduction Mode (CCM) and the Discontinuous Conduction Mode (DCM) of motor operation is illustrated in the diagrams of FIG. 2. In particular, FIGS. 2a, 2b, 2c, 2d depict typical armature current and pilot sensing current in both CCM and DCM operation. FIG. 2a shows the linear rise and fall of the armature current in states S1 and S2 of CCM operation. Likewise, FIG. 2b shows the linear rise of the sensing current in the pilot circuits 110 during state S1. However, since no current flows through the pilot circuits 110 during state S2, the current ramp from state S1 drops off to zero. FIG. 2c shows the armature current rising and falling in states S1 and S2, respectively, while zero current flows in the idle state S3. FIG. 2d shows the pilot sensing current rising in state S1 and zero current flowing in states S2 and S3, respectively. Note that FIGS. 2a and 2c indicate that the midpoint of the positive-sloped current ramp in state S1 is the average motor armature current during the conduction states of the PWM cycle. Likewise, FIGS. 2b and 2d indicate that the pilot current sensed at the point corresponding to the point ½S1 is at the midpoint of the time period $T_1$. It is the pilot current ($i_{pilot}$) sensed at $\frac{1}{2}T_1$ that is the signal generated by the pilot current detection circuit 102.

The technique employed in the current measuring system 100 assumes that the armature resistance IR drop is negligible compared to the sum of all other voltages in the circuit including the back EMF generated by the motor and the supply rail voltage ($V_{Rail}$). Further, the method assumes that the armature inductance is linear and is never driven into saturation. The current waveforms appear to be linear functions of time when viewed during one PWM cycle. Although pilot current alone is insufficient to produce a measure of average armature current, the combination of timing information derived from the correction circuit 104 (discussed hereinbelow) with $i_{pilot}$ provides an accurate measure of average armature current. This technique enjoys the advantages of pilot sensing circuits and extends their use to applications of average current measurement.

FIG. 2a discloses that the average armature current $<i_{arm}>$ in state S1 during CCM is close to the average armature current $<i_{arm}>$ of the entire PWM cycle regardless of the length of state S1. The average armature current from 0 to $T_1$ is approximately the same as the average armature current from 0 to $T_{PWM}$. If the cycle-to-cycle change in average current is sufficiently small, this approximation is very accurate. Since the PWM frequency is much higher than the highest motor control signal frequency, accuracy is assured. The pilot sensing current is a scaled replica of the armature current during state S1. The pilot current can be used to obtain a scaled average of the armature current over an entire PWM cycle. This relationship is expressed as:

$$K <i_{arm}>|_{PWM} \approx <i_{pilot}>|_{S1} = 1/T_1 \int_0^{T_1} i_{pilot} dt \quad [1]$$

where $<i_{arm}>$ $_{PWM}$ is the average armature current during the PWM cycle, $<i_{pilot}>$ $_{S1}$ is the average pilot current during state S1, K is a pilot-to-switch device scaling constant, and $T_1$ is the time at the end of state S1 which is equal to D1 * $T_{PWM}$ where D1 is the fraction of the duty cycle for state S1. The integral relationship expressed by equation [1] can be implemented by a combination of known circuits. However, that combination of circuits would be costly in terms of IC area and complexity. Additionally, the abrupt change in pilot current at the beginning and end of state S1 leads to current transients similar to the voltage transients experienced with sense resistors. The current transients introduce error into the current measurement. By sampling the pilot current in the middle of state S1, instead of integrating it, IC area and complexity are reduced and accuracy is improved.

The waveforms of FIGS. 2a, 2b, 2c and 2d consist of nearly linear ramp sections. The power supply rail voltage ($V_{Rail}$) behaves like an ideal voltage source and drives the motor armature which is a linear inductor. The result is a linear armature current ramp function. Motor generated back EMF, IR drops and other nonlinear effects are nearly constant or negligible over the PWM cycle. Therefore, they do not significantly affect the linearity of the current ramp. The midpoint of a linear ramp is equal to its average value. Sampling the armature current at $\frac{1}{2}T_1$, the midpoint of the state S1 ramp, produces the average S1 current or the average current of state S1. This quantity is useful in determining the average armature current and is expressed by $$<i_{pilot}>|_{S1} = i_{pilot}|_{\frac{1}{2}T_1} \quad [2]$$

The first clocked current mode sample and hold circuit 114 of FIG. 1 can implement the function expressed in equation [2]. The pulse width modulator 112 (hereinafter PWM circuit) generates the $\frac{1}{2}T_1$ timing signal. An example of this implementation of the function expressed in equation [2] is shown in FIG. 3a. The PWM circuit 112 comprises a pair of comparators and serves to generate two separate signals. First and second comparators 116 and 118 are shown in FIG. 3a. The first comparator 116 receives the voltage $V_{ramp}$ at the negative terminal and the voltage $V_{in}$ at the positive terminal. $V_{ramp}$ is supplied to the PWM circuit 112 from a modified ramp generator 120 within the correction circuit 104 as shown in FIG. 1. The voltage $V_{in}$ is the desired control input command signal delivered to the pilot control detection circuit 102 from the tape drive control (not shown). $V_{in}$ serves to control the magnitude of current transmitted to the three-phase brushless motor and thus the torque generated by the motor. The first comparator 116 generates a control signal for state S1 which is transmitted to a PWM switch controller (not shown) within the motor and amplifier 108.

The second comparator 118 also receives $V_{ramp}$ at the negative terminal but receives the voltage $V_{in/2}$ at the positive terminal. The voltage $V_{in/2}$ is generated by a voltage divider circuit comprised of a pair of equal valued resistors 122 and 124 operating on the voltage $V_{in}$ as shown in FIG. 3a. The second comparator 118 generates a timing signal at $\frac{1}{2}$S1 to clock the first sample and hold circuit 114 at the midpoint of state S1.

The motor and amplifier 108 is comprised of a three-phase brushless motor 126 and a plurality of flyback diodes 128, PWM switches 130 and power devices 134 as shown in FIG. 3a. The motor 126 is a PWM driven inductive load which serves to rotate, for example, a tape drive reel. The combination of the flyback diodes 128, the PWM switches 130 and the power devices 134 provides a three-phase full bridge power amplifier. Current is directed through the motor 126 by the PWM switches 130 and the power devices 134 when supply rail voltage $V_{rail}$ is impressed across the appropriate armature terminals. Each PWM switch 130 and power device 134 is connected across one of the flyback diodes 128. By closing the appropriate combination of PWM switches 130 and power devices 134 during state S1 as is known in the art, the amplifier can provide current flow in the motor 126 in any direction under all possible phase combinations. When the PWM switches 130 and power devices 134 are open-circuited during state S2, the flyback diodes 128 provide a path for current flow from electrical ground to the supply rail. Thus, the flyback diodes 128 cooperate with the correction circuit 104 to provide the signal that detects the end of state S2 and the beginning of the idle state S3.

The pilot sensing circuits 110 are comprised of a plurality of pilot devices 132 each matched to one of the power devices 134 as shown in FIG. 3a. The pilot devices 132 are Field Effect Transistor (FET) sensing devices each having three terminals. In the pilot devices 132, two of the three terminals are connected between the input terminal of the first sample and hold circuit 114 and electrical ground. The third terminal of each of the pilot devices 132 is connected to a corresponding third terminal of the matching power device 134. A more detailed explanation of each of the pilot devices 132 of the pilot sensing circuits 110 is now described in conjunction with FIG. 4.

Each of the pilot devices 132 preferably employed in the present invention provides improved accuracy by matching drain, gate and source voltages and eliminating the need for an operational amplifier. A power FET 133 (also referred to as a switch FET) has a drain electrode connected to a load device such as the three-phase brushless motor 126 shown in FIG. 3a. The pilot device 132 includes a sense FET 135 having a gate electrode connected to a gate electrode of the power FET 133 for receiving a control signal on a line 137. The sense FET 135 also includes a source electrode connected to a source electrode of the power FET 133. Hence, the gate and source voltages of the sense FET 135 follow the gate and source voltages, respectively, of the power FET 133. A sense voltage at a drain electrode of the sense FET 135 also accurately follows a load voltage at the drain electrode of the power FET 133. This is the case even though the drain electrodes of the sense FET 135 and the power FET 133 are not directly connected. Therefore, the sense FET 135 can accurately sense the load current of the power FET 133 even when the power FET 133 is operating far into its linear region.

Figure 4:
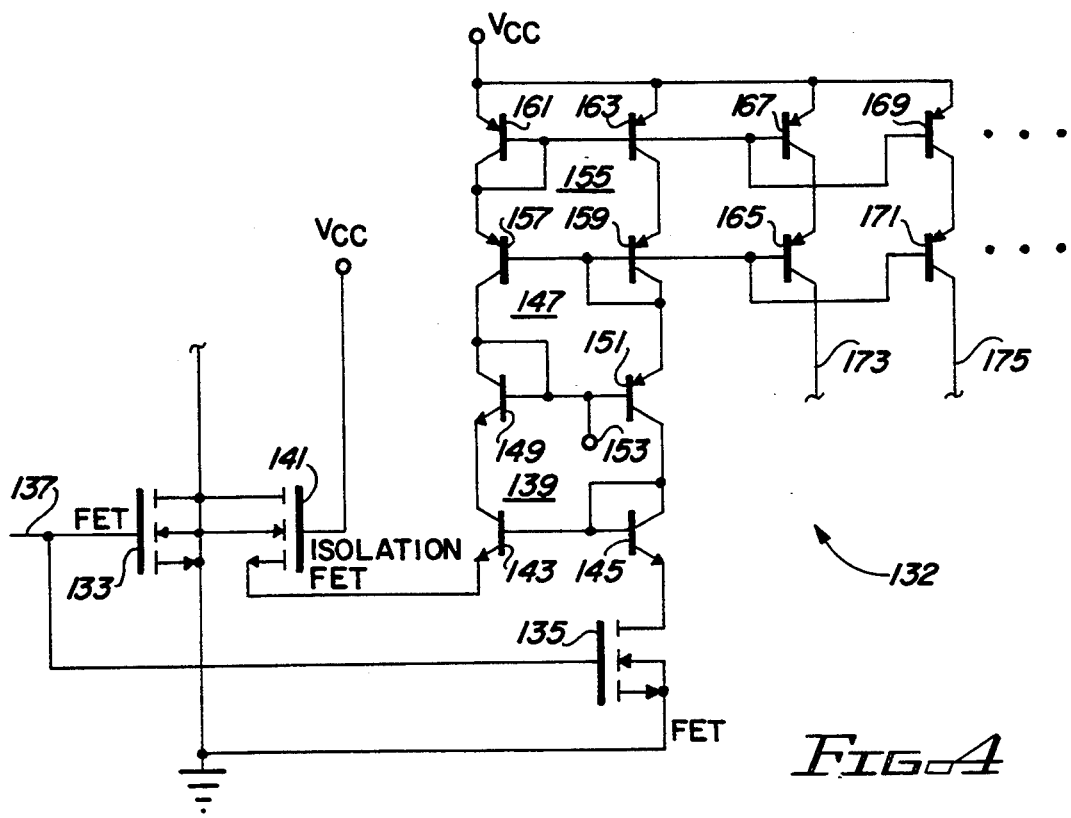

The drain electrode of the sense FET 135 is coupled to the drain electrode of the power FET 133 by a voltage follower 139 and an isolation FET 141 as shown in FIG. 4. The isolation FET 141 is provided to protect a transistor 143 from the load voltage at the drain electrode of the power FET 133 which may exceed the breakdown voltage of transistor 143. The isolation FET 141 has a drain electrode connected to the drain electrode of the power FET 133, a gate connected to a collector supply voltage ($V_{cc}$), and a source electrode connected to an emitter electrode of the transistor 143. The voltage follower 139 includes the transistor 143 and a transistor 145 which are matched and identically biased, each having a base electrode connected to a collector electrode of transistor 145. The load voltage at the emitter electrode of transistor 143 is substantially equal to a sense voltage developed at the emitter electrode of transistor 145. The emitter electrode of transistor 145 is connected to the drain electrode of the sense FET 135. A voltage drop ($V_{be}$) across the base-emitter junction of transistor 143 is canceled by the voltage drop ($V_{be}$) across the base-emitter junction of transistor 145.

A current mirror 147, formed by matched transistors 149 and 151, provides matched biased currents through the transistors 143 and 145 as shown in FIG. 4. The transistor 151 has an emitter electrode connected to the collector electrode of the transistor 145 and a base electrode connected to base and collector electrodes of transistor 149. Transistor 149 has an emitter electrode connected to a collector electrode of transistor 143. The current mirror 147 has a bandwidth that accurately follows the pulse width modulated load current and hence the modulated load voltage. As a result, the voltages at the gate, source and drain electrodes of sense FET 135 accurately follow the voltages of the gate, source and drain electrodes, respectively, of power FET 133 even at high frequencies. Furthermore, the sense FET 135, the voltage follower 139, and the current mirror 147 are integrated on a single substrate with the power FET 133. Thus, variations due to processing and environmental conditions cancel. An output terminal 153 is available at the base electrodes of transistors 149 and 151 for providing a bias voltage therefrom.

As the load current through the power FET 133 changes, the load voltage at its drain electrode also changes. The sense voltage at the drain electrode of sense FET 135 will follow the load voltage changes through the voltage follower 139. The sense FET 135 is scaled proportionally to the power FET 133. For example, the power FET 133 exhibits a gate electrode width that is one-thousand times greater than the gate electrode width of sense FET 135. Thus, the sense current generated in the sense FET 135 is one/one-thousandth of the load current. The sense current is an accurately scaled representation of the load current and may be used to monitor the load current. However, errors may be induced into the sense current by an Early effect in transistors 143 and 145. The Early effect is well understood by those skilled in the art and is described in *Analysis and Design of Analog Integrated Circuits* by P. R. Gray and R. G. Meyer, John Wiley and Sons, New York, 1977, pp. 16–18. Early effect errors are minimized by stacking additional devices in a cascode configuration.

A cascode current mirror 155 provides a plurality of transistors 157, 159, 161 and 163 connected in a cascode configuration and which are complementary to transistors 143, 145, 149 and 151 as shown in FIG. 4. Transistor 157 has a collector electrode connected to a collector electrode of transistor 149, a base electrode connected to base and collector electrodes of transistor 159 and to the collector electrode of transistor 151, and an emitter electrode connected to collector and base electrodes of transistor 161. Transistor 159 has an emitter electrode connected to a collector electrode of transistor 163. Transistor 163 has a base electrode connected to base and collector electrodes of transistor 161 and an emitter electrode connected to the supply voltage $V_{cc}$. Transistor 161 also has an emitter electrode connected to the supply voltage $V_{cc}$.

Additional scaled replicas of the sense current can now easily be provided by adding current legs to the cascode current mirror 155 or by connecting a current leg to the output terminal 153. A first current leg is provided by transistors 165 and 167 and a second current leg is provided by transistors 169 and 171 as shown in FIG. 4. Transistors 167 and 169 each have an emitter electrode connected to the supply voltage $V_{cc}$, a base electrode connected to a base electrode of transistor 163, and a collector electrode connected to an emitter electrode of transistors 165 and 171, respectively. Transistors 165 and 171 each have a base electrode connected to a base electrode of transistor 159, and a collector electrode for providing the replicated currents at a pair of lines 173 and 175, respectively, as shown in FIG. 4. The isolation FET 141, the sense FET 135, and transistors 143, 145, 149, 151, 157, 159, 161, 163, 165, 167, 169 and 171 which comprise the pilot device 132 are duplicated for each power FET 133 in the pilot sensing circuit 110.

The first current mode sample and hold circuit 114 includes a clock input terminal identified as "clock", a sample input terminal identified as "$i_{in}$" and an output current terminal identified as $i_{out}$ as shown in FIG. 3a. The clock terminal is connected to the second comparator 118, the $i_{in}$ terminal is connected to the pilot devices 132 and the $i_{out}$ terminal is connected to the multiplier 106 as shown in FIG. 1. The function of the first sample and hold circuit 114 is to sample and hold the pilot current $i_{pilot}$ at the pilot devices 132 upon receipt of the $\frac{1}{2}$S1 timing signal from the second comparator 118. Thus, the sample $i_{pilot}$ held by the first sample and hold circuit 114 is measured at the midpoint of state S1 and represents (e.g., is proportional to) the average armature current during state S1.

During the sampling phase, current flows from the $i_{in}$ terminal to electrical ground but the sample information flows from the pilot devices 132 to the $i_{in}$ terminal. The signal subsequently available at the $i_{out}$ terminal of the first sample and hold circuit 114 is the average pilot current $I_{pilot}$ evaluated at $\frac{1}{2}T_1$ as shown in FIG. 2b. If the motor 126 or other inductive load always operated in the CCM and never operated in the DCM, the pilot current detection circuit 102 would be adequate. The $i_{pilot}$ sensed at the midpoint of state S1 would be sufficient for use as the average motor current. Correction of the sensed armature current during DCM operation is discussed hereinbelow.

It is noted that the current mode sample and hold circuits disclosed in the present invention including the first sample and hold circuit 114 utilize less silicon area on an IC. Further, the sample and hold circuits are less complex because a clocked sample and hold circuit is smaller and easier to realize than a high gain-bandwidth operational amplifier circuit. Additionally, circuit operation below electrical ground is not required and sampling in the middle of state S1 avoids the switching transient noise problem normally encountered. The clocked current mode sample and hold circuits utilized in the present invention are treated in greater detail in co-pending U.S. patent application having Ser. No. 07/760,534 filed Sep. 16, 1991 and entitled Current Mode Sample and Hold Circuit.

The timing diagrams associated with the pilot current detection circuit 102 for CCM operation are shown in FIG. 3b. The functions shown in FIG. 3b(1) include $V_{ramp}$, $V_{in}$ and $V_{in/2}$. The voltage $V_{ramp}$ is fed to the negative terminals of the first and second comparators 116 and 118 from the modified ramp generator 120 in the correction circuit 104. $V_{ramp}$ is the signal that sets the beginning and end of each PWM cycle and provides the linear ramp function which enables the selection of the correct signal timing. Three PWM cycles ($T_{PWM}$) are shown in FIG. 3b(1). The voltage $V_{in}$ is the input command fed to the positive terminal of the first comparator 116 from the tape drive control logic (not shown) which controls the magnitude of current delivered to the motor or other inductive load. The intersection of the curve $V_{in}$ with the curve $V_{ramp}$ determines the boundary between states S1 and S2. The voltage $V_{in/2}$ is provided by the voltage divider comprised of resistors 122 and 124. The intersection of the curves representing $V_{in/2}$ and $V_{ramp}$ identifies the midpoint of state S1.

FIG. 3b(2) is the curve that represents the operation of the pilot current detection circuit 102 during the CCM state S1. The curve transients from low-to-high at the beginning of each PWM cycle as defined by the beginning of the voltage $V_{ramp}$. Likewise, the curve transients from high-to-low anytime the $V_{in}$ curve intersects that portion of the $V_{ramp}$ curve having a positive slope. Thus, all transitions of the curve representing state S1 in FIG. 3b(2) occur when $V_{ramp}$ intersects the curve $V_{in}$ in FIG. 3b(1). The curve representing the state S$\frac{1}{2}$ is shown in FIG. 3b(3). The S$\frac{1}{2}$ curve transients from low-to-high at the beginning of each PWM cycle in a manner duplicate to the curve representing state S1. In addition, the curve representing state S$\frac{1}{2}$ transients from high-to-low anytime the curve $V_{ramp}$ exceeds the curve $V_{in/2}$.

Note that the curve for state S1 in FIG. 3b(2) and the curve for state S$\frac{1}{2}$ in FIG. 3b(3) increase over time since the voltage $V_{in}$ increases over the three PWM cycles. Thus, $V_{in}$ exceeds $V_{ramp}$ for a greater portion of each PWM cycle. Therefore, the curves representing state S1 and state S$\frac{1}{2}$ remain high for a proportionally greater part of the PWM cycle. Finally, FIG. 3b(4) shows the pilot current $i_{pilot}$ and the output current $i_{out}$ of the first sample and hold circuit 114 superimposed. For one PWM cycle, $i_{out}$ is shown as a constant. However, at the point $\frac{1}{2}T_1$, the output current $i_{out}$ is adjusted to the present value of $i_{pilot}$ for the average current of that PWM cycle and remains there for another PWM cycle.

Although the pilot current detection circuit 102 measures average armature current during CCM operation, it fails to account for the idle state S3 when current does not flow during DCM operation. Thus, the pilot current detection circuit 102 of FIG. 3a is not suitable for applications utilizing DCM operation. Over a full PWM cycle, the increase in inductor current during state S1 is approximately canceled by the decay of inductor current during state S2. Therefore, the average current during state S1 is nearly equal to the average current during state S2.

The waveforms for DCM operation shown in FIG. 2 illustrate that the average armature current $<i_{arm}>$ is related to the state S1 midpoint current, e.g., $i_{arm}$ at $\frac{1}{2}T_1$. To accurately represent average current, the midpoint current must be reduced by a factor which compensates for time in the idle state S3. D3 represents the fraction of the duty cycle spent in the idle state S3. Thus, the fraction of the duty cycle spent in states S1 and S2 can be represented by the term $(1-D3)$. The average armature current is proportional to the pilot current at time $\frac{1}{2}T_1$ multiplied by the term $(1-D3)$. This relationship can be expressed as follows:

$$K<i_{arm}>|_{PWM}=(1-D3)<i_{pilot}>|_{S1}=(1-D3)i_{pilot}|_{\frac{1}{2}T1} \quad [3]$$

Note that the term D3 diminishes to zero in CCM operation and thus the expression in equation [3] is valid in both CCM and DCM operation The midpoint current at $\frac{1}{2}S1$ scaled by the term $(1-D3)$ produces an average current $i_{avg}$ valid under all conditions. The function of equation [3] can be implemented by scaling the output current $i_{out}$ of the first sample and hold circuit 114 shown in FIGS. 1 and 3a by the term $(1-D3)$ on a cycle-by-cycle basis. Any suitable scaling method can be used. Convention PWM amplifiers do not provide an event to signal the change between states S2 and S3. Since the average current is found by scaling the current at the midpoint of state S1 by the term $(1-D3)$ on a cycle-by-cycle basis, knowledge of D3 is required. The determination of the end of state S2 (and thus the beginning of the idle state S3) and the generation of the scaling factor $(1-D3)$ is provided by the correction circuit 104 of the current measuring system 100 of FIG. 1.

The correction circuit 104 of the current measuring system 100 is shown in block form in FIG. 1 and includes the modified ramp generator 120, a Detect $T_2$ block 136 and a second clocked current mode sample and hold circuit 138. The modified ramp generator 120 is a sawtooth generator utilized to produce a linear voltage ramp output $v_{ramp}$ needed for pulse width modulation. The ramp generator 120 also provides a current ramp output $i_{ramp}$ besides the normal voltage ramp output $v_{ramp}$. The current ramp output $i_{ramp}$ is sampled and held in the second sample and hold circuit 138 at time $T_2$, e.g., the instant the motor and amplifier 108 switch out of state S2. This instant of time occurs exactly $(1-D3)$ of the way through the PWM cycle. The current held by the second sample and hold circuit 138 is therefore $(1-D3)i_{ref}$. The ratio of the held output current $(1-D3)i_{ref}$ to the reference current $i_{ref}$ is $(1-D3)$. The term $(1-D3)$ is ideal for providing the necessary scaling factor to the multiplier circuit 106 shown in FIG. 1.

The modified ramp generator 120 is shown in more detail in FIG. 5a and includes a pair of transistors 140 and 142 whose base electrodes are connected to a common node 144. Transistor 140 is a low impedance emitter-follower utilized to drive the linear ramp voltage $v_{ramp}$ across a resistor 146 and to supply the linear ramp current $i_{ramp}$ to the second sample and hold circuit 138. Transistor 142 is a diode connected NPN transistor utilized to cancel the voltage $V_{be}$ of transistor 140 when the ramp voltage $v_{ramp}$ is reset to zero. The common node 144 is connected to a positive power supply rail $V_{cc}$ via a constant d.c. current source having the value of $I_{bias}$. An integrating capacitor 148 is connected between the common node 144 and electrical ground. The integrating capacitor 148 serves to generate the linear ramp voltage $v_{ramp}$ at the base of transistors 140 and 142 by integrating the constant current $I_{bias}$.

The peak value of the current ramp output $i_{ramp}$ is scaled to a reference current $I_{ref}$ shown flowing through a resistor 150 to electrical ground in FIG. 5a. The reference current $I_{ref}$ is supplied to the correction circuit 104 from another part of the system 100. The voltage developed across resistor 150 as a result of $I_{ref}$ flowing therethrough is a reference voltage $V_{ref}$. Reference voltage $V_{ref}$, which is equivalent to the peak value of $V_{ramp}$, is employed by a comparator 152 to determine the end of the PWM cycle (e.g., $T_{PWM}$). Resistor 146 is identical to resistor 150. The linear ramp current $i_{ramp}$ having a range of from zero-to-$I_{ref}$ is caused to flow when the linear ramp voltage $v_{ramp}$ having a range of from zero-to-$V_{ref}$ is impressed across resistor 146.

The comparator 152 receives the linear ramp voltage $v_{ramp}$ at the positive input terminal and the reference voltage $V_{ref}$ at the negative input terminal. The function of comparator 152 is to detect the time when $v_{ramp}$ is equal to $V_{ref}$. The linear supply voltage $v_{ramp}$ begins at zero volts and rises to the amplitude of $V_{ref}$ at which time the output of comparator 152 goes high. This action causes a reset control circuit 154 to close a switch 156 for an instant of time. The closing of the switch 156 short circuits transistor 142 to electrical ground and resets $v_{ramp}$ to zero. The reset control circuit 154 has the effect of scaling the peak value of the linear ramp current $i_{ramp}$ to equal the reference current $I_{ref}$. This ensures that the peak current provided by the ramp generator 120 is equal to the reference current $I_{ref}$.

A suitable method of generating the linear ramp current $i_{ramp}$ is to provide the constant current $I_{bias}$ to the integrating capacitor 148. However, in order to prevent $V_{ramp}$ from dissipating to ground level, the voltage across the capacitor 148 is only reduced to one $V_{be}$ above ground potential. This is the function of the diode connected transistor 142 connected to the common node 144. When switch 156 is closed, the terminal of capacitor 148 assumes a potential of one $V_{be}$ above ground and the voltage across resistor 146 is zero. The ramp generator 120 then begins to integrate or ramp-up from that point. Transistor 142 is utilized to match the $V_{be}$ drop of transistor 140 so that $I_{ref}$ flowing into resistor 150 matches the $i_{ramp}$ flowing into resistor 146 connected to the second sample and hold circuit 138. After switch 156 is closed and short circuits transistor 142 to ground, the PWM cycle repeats itself. The output of the ramp generator 120 is the linear ramp current $i_{ramp}$ which is sampled and held by the second sample and hold circuit 138 at the end of state S2.

The timing diagrams associated with the correction circuit 104 for both CCM and DCM operation are shown in FIG. 5b. FIG. 5b(1) shows the linear ramp voltage $v_{ramp}$ generated by the ramp generator 120. Note that the amplitude of $v_{ramp}$ ranges between zero and the reference voltage $V_{ref}$. Three consecutive PWM cycles are shown. FIG. 5b(2) is the curve that represents the operation of the correction circuit 104 during state S2. The curve for state S2 transients from low-to-high when $v_{ramp}$ is increasing with a positive slope. The transition from high-to-low occurs at the point identified by $(1-D3)T_{PWM}$ which signifies the end of state S2. Note that the period of each of the consecutive PWM cycles is equal. However, because the length of the idle state S3 in the individual PWM cycles varies, the length of the corresponding $(1-D3)T_{PWM}$ also vary. Therefore, the length of the individual states S2 during the three consecutive PWM cycles is not equivalent. FIG. 5b(3) illustrates the correction circuit output signal $i_{out}$ which is equal to $(1-D3)I_{ref}$ superimposed over the linear ramp current $i_{ramp}$. Note that $i_{ramp}$ ranges between zero and $I_{ref}$. The output current $(1-D3)I_{ref}$ is constant for states S1 and S2 in the first PWM cycle. However, the value of $(1-D3)I_{ref}$ is adjusted each PWM cycle in accordance with the then present value of D3 and $I_{ref}$.

The exact time of transition between states S2 and S3 must be known in order to trigger the second sample and hold circuit 138 shown in FIGS. 1 and 5a. The Detect $T_2$ block 136 provides a signal at this transition time. This is accomplished by a logical-OR function utilized to monitor all terminals of the inductive motor load 126 shown in FIG. 3a. When the inductor current is increasing during state S1, all terminals of the motor armature are more positive that the supply rail return line. When the PWM switches 130 and power devices 134 are open circuited during state S2, the collapsing magnetic field of the armature windings pulls current up from the ground return line through one of the lower flyback diodes 128. The collapsing magnetic field then drives the current from the ground return line back through one of the upper flyback diodes 128 into the high voltage power rail. At least one of the armature winding leads maintains a negative potential greater than one diode drop below ground potential. That armature winding extracts current from the return line for delivery into the supply rail during state S2. If the armature winding is operating in DCM, its magnetic field collapses to zero before the voltage is reapplied at the beginning of the next PWM cycle. When the stored magnetic field decays to zero, flyback current stops flowing and all armature winding terminals are once again positive or zero.

The Detect $T_2$ block 136 comprises a threshold comparator 158 which detects when one or more of the armature winding or inductor leads of the motor 126 is below ground potential. The initiation of states S1 and S2 are events of which the timing is controlled and defined by the PWM circuit 112. The threshold comparator 158 provides a logic event marking the time when state S2 ends and when state S3 begins. This enables an identification of the fraction of the duty cycle spent in state D3 which is required for the calculation of the scaling factor $(1-D3)$.

The threshold comparator 158 functions by constantly comparing the voltage at each of the motor armature winding terminals $\phi A$, $\phi B$ and $\phi C$ to a reference voltage. This can be accomplished by monitoring the voltage across the low side flyback diodes 128 as shown in FIG. 3a. During state S2, current in the flyback diodes 128 will force at least one of the phase terminals $\phi A$, $\phi B$ or $\phi C$ below ground potential as is known in the art. This will cause the output signal of the threshold comparator 158 to drop to a logic low level. When the armature current decays to zero during DCM operation, none of the flyback diodes 128 are forward biased any longer. The threshold comparator 158 responds by raising its output signal to a logic high level.

The threshold comparator 158 which is used with a three-phase inductive load is shown in FIG. 6. The comparator 158 includes input leads identified as $\phi A$, $\phi B$ and $\phi C$ each connected to the emitter terminal of one of three separate NPN transistors identified by the numerals 160, 162 and 164, respectively. The base electrode of each of the transistors 160, 162 and 164 is connected via a node 166 to the positive terminal of a fixed d.c. power supply identified as $V_{be}/2$. The negative terminal of the d.c. power supply $V_{be}$ is connected to electrical ground. Each of the collector electrodes of transistors 160, 162 and 164 is connected to a common line 168. The common line 168 is connected to a positive logic supply $V_{dd}$ via a constant current source 170. An output signal identified as $-S2_{out}$ is retrieved from an output terminal connection 172 located on line 168.

The input leads $\phi A$, $\phi B$ and $\phi C$ are connected to the three motor armature terminals. If any one of the armature terminals of the motor 126 is more than $\frac{1}{2}V_{be}$ (e.g., about 0.3 volts for silicon junctions) below ground potential, the corresponding NPN transistor 160, 162 or 164 is forward biased ON. Current will then flow in the common line 168 from the current source 170 through the biased ON transistor to the phase $\phi A$, $\phi B$ or $\phi C$ having the lowered voltage. The voltage at terminal 172 will be lowered causing the output signal $-S2_{out}$ to be pulled to a low logic level. The low logic level indicates that current is flowing in the flyback diodes 128 and that the motor amplifier 108 is presently in state S2. The logic output signal $-S2_{out}$ remains at the low logic level during state S2 of each PWM cycle but is nominally high at all other times.

However, when all three armature terminals $\phi A$, $\phi B$ and $\phi C$ are more positive than 0.5 $V_{be}$ below ground potential, each of the three transistors 160, 162 and 164 are biased OFF. Thus, none of the transistors 160, 162 or 164 are conductive and current does not flow from the source 170 to one of the phases. Therefore, the voltage at terminal 172 increases causing the output signal $-S2_{out}$ to be pulled to a high logic level. The high logic level at $-S2_{out}$ indicates that there is no longer any current in the flyback diodes 128. This situation occurs during one of two possible conditions. Either (a) the amplifier 108 entered the idle state S3 and current does not flow in which case the second sample and hold circuit 138 is clocked before the end of $v_{ramp}$ and the scaling factor $(1-D3)$ is applied to $i_{pilot}$ at $\frac{1}{2}T_1$, or (b) the next PWM cycle has started and current is flowing through the PWM switches 130 and power devices 134. Under these conditions, the amplifier 108 transitions directly from state S2 to state S1 and there is no DCM of operation. The output signal $-S2_{out}$ that is generated by the Detect $T_2$ block 136 occurs after the beginning of the next PWM cycle and will not affect the operation of the PWM amplifier 108. Thus, the scaling factor $(1-D3)$ shown in equation [3] is equal to one and the output signal does not change. Thus, there is no correction to the current measuring system 100 when there is no DCM of operation.

When a transition of the output signal $-S2_{out}$ from a low logic level to a high logic level occurs and is caused by the beginning of the idle state S3, it is noted that the transition actually indicates the end of state S2. The end of state S2 is equivalent to the beginning of state S3 since the idle state S3 is initiated, if at all, immediately at the end of state S2. It is not possible to directly measure the beginning of state S3 since it is an idle state and there are no parameters to measure.

The timing diagrams associated with the threshold comparator 158 of the Detect $T_2$ circuit 136 for DCM operation are shown in FIG. 7. Three consecutive PWM cycles $T_{PWM}$ are shown. The functions shown in FIG. 6a include the linear ramp voltage or timing ramp $v_{ramp}$ of the fixed frequency PWM generator 112. Note that $v_{ramp}$ ranges between zero and the reference voltage $V_{ref}$. Superimposed over $v_{ramp}$ is a dotted line designated as $V_{in}$ which represents the PWM input control voltage. Note that $V_{in}$ is increasing with time which causes each successive PWM cycle to have a wider pulse width and a progressively higher average armature current. FIG. 7 shows the idealized rise and fall of armature current e.g., $i_{load}$ during each successive PWM cycle. Note that $i_{load}$ in the third PWM cycle has risen to the threshold of the CCM operation. Hence, there is no idle state S3.

A graph of $V_{phase}$ is shown in FIG. 7. $V_{phase}$ is a plot of the voltage of the motor armature inductive load measured at one of the phase terminals $\phi A$, $\phi B$ or $\phi C$ and referenced to power supply ground. Note that states S1, S2 and S3 are shown in the graph. The selected phase terminal is connected to the high voltage rail during state S1 and is connected to the low voltage (ground) rail through a flyback diode 128 during state S2. During state S3, this phase terminal is essentially open circuited and its voltage is a decaying oscillation governed by the interaction between the load inductance and power amplifier parasitic capacitance. This ringing effect can retrigger the output signal $-S2_{out}$ after the end of state S2 if its amplitude exceeds the $\frac{1}{2}V_{be}$ threshold of the comparator 158.

The output signal $-S2_{out}$ of the threshold comparator 158 is shown in FIG. 7. Note that $-S2_{out}$ is low during state S2 and nominally high during states S1 and S3. The output signal $-S2_{out}$ changes state whenever $V_{phase}$, shown in FIG. 7, crosses the $-V_{be}/2$ threshold. The first low-to-high transition of the threshold comparator output signal $-S2_{out}$ in each cycle marks the boundary between the times of states S2 and S3. This is the event of interest since it signals the initiation of the idle state S3. The other events including the beginning and end of a particular PWM cycle and the transition between states S2 and S3 times are available directly from the PWM timing circuitry.

When the voltage at terminal 172 shown in FIG. 5 increases, the threshold comparator output signal $-S2_{out}$ is pulled to a high logic level. This event indicates the end of state S2 and the beginning of state S3. The high logic signal is utilized to clock the second current mode sample and hold circuit 138 as is shown on FIGS. 1 and 5a. The second sample and hold circuit 138 of the correction circuit 104 is identical to the first current mode sample and hold circuit 114 of the pilot current detection circuit 102 of FIG. 3a. The second sample and hold circuit 138 samples the linear ramp current $i_{ramp}$ (which is scaled to the reference current $I_{ref}$) at the end of state S2. The signal utilized to clock the second sample and hold circuit 138 to announce the end of state S2 and the beginning of state S3 is provided by the threshold comparator 158 shown in FIG. 6. The output signal of the second sample and hold circuit 138 is the reference current $I_{ref}$ multiplied by the scaling factor $(1-D3)$ as shown in FIG. 1. That fraction of the duty cycle time D3 spend in state S3 can now be calculated with the knowledge of the initiation of state S3. The correction circuit output signal $(1-D3)I_{ref}$ is then provided to the multiplier circuit 106 shown in FIG. 1.

The multiplier circuit 106 shown in FIG. 1 is employed to scale the pilot current $i_{pilot}$ at $\frac{1}{2}T_1$ by the scaling factor $(1-D3)$. Known analog multiplier circuits are available to perform this task. An example of a suitable multiplier circuit for this application is the Gilbert Translinear Controlled-Cascode Multiplier. This multiplier exhibits high bandwidth, simplicity and current mode operation. As shown in FIG. 1, the multiplier circuit 106 receives the inputs of $i_{in}$ (e.g., $i_{pilot}$ at $\frac{1}{2}T_1$ midstream) from the first sample and hold circuit 114, $I_{ref}$ from an external current source and $KI_{ref}$ from the second sample and hold circuit 138. The output signal from the multiplier circuit 106 is $Ki_{in}$. By using $i_{pilot}$ at $\frac{1}{2}T_1$ midstream for the $i_{in}$ input and $(1-D3)$ as the factor K, the desired result of $(1-D3)i_{pilot}$ at $\frac{1}{2}T_1$ midstream is achieved.

The output signal of the multiplier circuit 106 shown in FIG. 1 represents the true average armature current under all states of operation. It is valid between the $T_2$ instant of the measured PWM cycle and the $\frac{1}{2}T_1$ instant of the next PWM cycle. It may be held through the entire PWM cycle by a third current mode sample and hold circuit 174. The third sample and hold circuit 174 is duplicate to the first and second sample and hold circuits 114 and 138, respectively. Two inputs are received by the third sample and hold circuit 174 which include the true average armature current [e.g., $(1-D3)i_{pilot}$ at $\frac{1}{2}T_1$ midpoint] from the multiplier circuit 106 and a clock timing signal from the PWM generator 112. The third sample and hold circuit 174 is clocked at the beginning of each PWM cycle and generates a current measuring system output current which represents a scaled average of the armature current over the entire previous PWM cycle. The current measuring system output signal is then available for filtering and use in an error control block (not shown) in the current measuring PWM system 100.

Those skilled in the art will realize that phase terminal inputs $\phi A$, $\phi B$ and $\phi C$ shown in FIG. 6 can retain voltages high enough to break down the base-emitter junctions of transistors 160, 162 and 164, respectively. It is also understood by those skilled in the art that armature current does not cleanly stop at the end of D2 of state S2 but exhibits a decaying oscillation controlled by the load inductance and stray circuit capacitance. In addition, load and parasitic capacitances on the output signal $-S2_{out}$ can defeat the purpose of the threshold comparator 158 by slowing response time. Therefore, refinements to the logical-OR threshold comparator 158 are disclosed in FIG. 8 and addressed at this time. The logic circuit shown in FIG. 8, hereinafter identified by the reference number 200, addresses the problems of breakdown, timing and oscillations caused by parasitics.

The logic circuit 200 includes an input protection section 202 which serves to isolate the transistors 160, 162 and 164 of the threshold comparator 158 from the winding terminal phases $\phi A$, $\phi B$ and $\phi C$. This is accomplished by connecting each of the three winding terminal phases $\phi A$, $\phi B$ and $\phi C$ to the drain electrode of a high-voltage, N-channel enhancement mode FET gate 204. The source electrode of each enhancement mode FET gate 204 drives the input of the threshold comparator 158. Each FET gate 204 is connected to a fixed positive voltage $(V_{bias})$ having a magnitude greater than the threshold of the FET gate 204. Thus, each FET gate 204 is normally conducting. When any one of the armature winding terminal phases φA, φB or φC is near or below ground potential, the corresponding FET gate 204 conducts and passes its winding voltage to the threshold comparator 158. As the winding voltage becomes positive, the gate-source voltage of the series FET gate 204 drops below its threshold and the FET gate 204 cuts off. This action protects the base-emitter junction of the corresponding transistor 160, 162 or 164 from reverse breakdown. A P-channel enhancement mode FET gate 206 connected between the emitter electrode of each transistor 160, 162 and 164 and electrical ground serves to conduct current leaking from the series FET gate 204 to electrical ground. This construction prevents the emitter-base voltage of transistors 160, 162 and 164 from building up to their reverse breakdown threshold.

The logical-OR threshold comparator 158 is identical to that shown in FIG. 6. One NPN transistor 160, 162 or 164 monitors each phase φA, φB or φC of the inductive load. The base electrodes of each of the transistors 160, 162 and 164 are connected to a fixed voltage source via node 166. The value of the fixed voltage source has been chosen to be equal to $\frac{1}{2}V_{be}$ for this application. Each transistor 160, 162 and 164 is biased OFF when the corresponding winding terminal φA, φB or φC is more positive than $-\frac{1}{2}V_{be}$. However, when a winding terminal φA, φB or φC goes more negative than $-\frac{1}{2}V_{be}$, its corresponding transistor 160, 162 or 164 energizes pulling the common collector node on common line 168 to ground potential. This event only occurs during state S2.

A fixed voltage generator block 208 referred to as the $V_{be}/2$ generator creates a voltage of one-half the base-emitter forward drop of the transistors 160, 162 and 164 of the threshold comparator 158. A high-gain transistor 210 similar to the threshold transistors 160, 162 and 164 has its base electrode biased through a resistor divider comprised of resistors 212 and 214. Resistor 214 has a resistive value twice that of resistor 212. The resistors 212 and 214 of the resistor divider are connected between the collector and emitter electrodes of transistor 210. The collector voltage of transistor 210 thus becomes 3/2 the value of $V_{be}$. A second transistor 216 identical to transistor 210 is operated as an emitter-follower. Transistor 216 subtracts the voltage $V_{be}$ from the 3/2 $V_{be}$ collector voltage of transistor 210. This design delivers a low impedance source of $V_{be}/2$ to node 166 of the threshold comparator 158. Each transistor 210 and 216 is connected to the positive logic supply $V_{dd}$ via constant current sources 215 and 217, respectively. A resistor 218 biases the emitter-follower transistor 216 to maintain a low impedance on the output of transistor 210. A capacitor 220 passes high frequency transients to ground and maintains a low impedance path for high frequencies.

A buffer block 222, referred to as a speed-up buffer, provides an active load to the logic output of the threshold comparator 158 on the common line 168 and buffers the output signal for use by other circuitry. The output node or common line 168 of the comparator 158 is biased with the current source 170. Thus, the rise time of the output node 168 is increased by stray capacitance. By driving the base electrode of a grounded emitter transistor amplifier 224 within the buffer block 222, the otherwise slow moving threshold comparator output signal behaves like a fast acting current output signal. The voltage range of the output signal of the threshold comparator 158 is clamped between ground and $+V_{be}$ to minimize the ability of stray capacitance to delay the rise of the signal.

The collector electrode of transistor amplifier 224 drives both a standard logic inverter 226 and the gate electrode of a CMOS FET 228. The logic inverter 226 further buffers the signal from the threshold comparator 158. The CMOS FET 228 is connected to the transistor amplifier 224 as a positive feedback amplifier. Both the inverter 226 and the FET 228 are connected to the positive logic supply $V_{dd}$ via constant current sources 230 and 232, respectively. When the output signal of the threshold comparator 158 is held down by at least one of the transistors 160, 162 or 164, the CMOS FET 228 supplies extra current into the output node or common line 168. When the transistors 160, 162 and 164 begin to turn off at the end of the time for state S2, the extra current assists in rapidly pulling up the voltage on the output node of the comparator 158. When the output signal of the comparator 158 reaches $+V_{be}$, the transistor amplifier 224 turns on pulling the gate of the FET 228 down and turning off the supply of extra current. This results in reduced power consumption and permits transistors 160, 162 and 164 to pull the voltage of the comparator output node down faster at the beginning time of the next state S2. Thus, the buffer block 222 limits the voltage swing of the threshold comparator 158 to one diode forward voltage drop, limits the effect of parasitic circuit capacitance and implements a positive feedback loading scheme to reduce transition times at its input.

Figure 8:
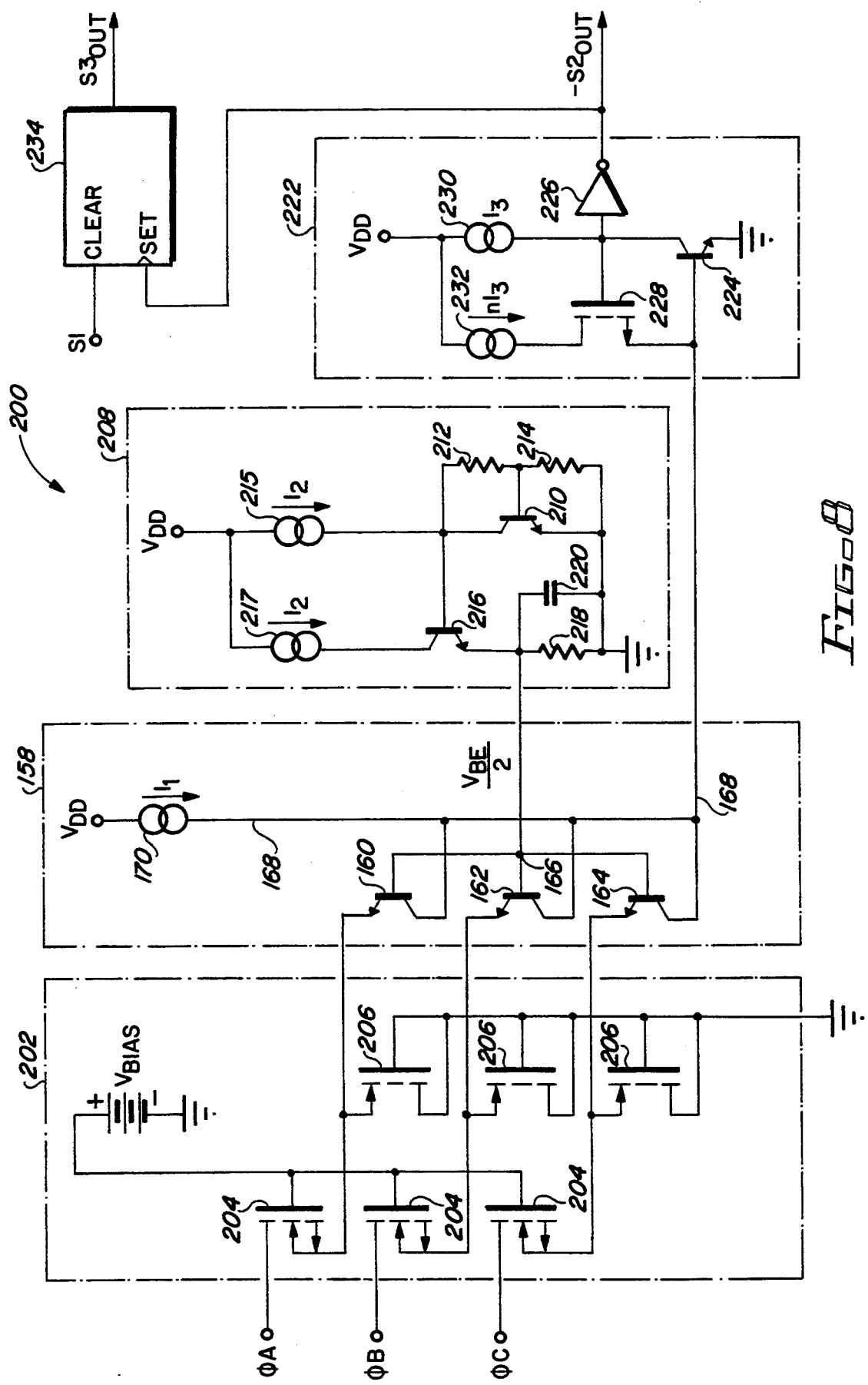
FIG. 8 is a schematic diagram of an enhanced version of a flyback detection circuit showing protection, comparator, generator and output sections.

The output signal of the logic circuit 200 is provided by the logic inverter 226 as is shown in FIG. 8. The output signal, identified as $-S2_{out}$, is a high logic signal when each of the transistors 160, 162 and 164 is biased OFF. This occurs when each of the winding terminals φA, φB and φC is more positive than $-\frac{1}{2}V_{be}$. Likewise, the output signal $-S2_{out}$ is a low logic signal when at least one of the transistors 160, 162 or 164 is conductive. This condition occurs when at least one of the winding terminals φA, φB or φC goes more negative than $-\frac{1}{2}V_{be}$. Under these conditions, the corresponding transistor 160, 162 or 164 energizes pulling the common collector node on common line 168 to ground potential. This event only occurs during state S2. The output signal $-S2_{out}$ of logic circuit 200 is utilized to identify the end of state S2 and the beginning of state S3.

Stray capacitance causes the load terminal voltage to oscillate during state S3. If the amplitude swing is large enough, the oscillations will trigger the threshold comparator 158 multiple times during the same PWM cycle. A latch block 234 can be added to the output of the buffer block 222 at the end of the comparator 158 so that only the first positive transition per PWM cycle is detected. The latch block 234 is shown connected to the output of the logic inverter 226 in FIG. 8. A clocking signal S1 provided by the PWM circuit 112 shown in FIG. 1 is utilized to clear the latch at the end of each PWM cycle. The output signal $S3_{out}$ of the latch block 234 is true during state S3.

Thus, the present invention has been described herein with reference to a particular embodiment for a particular application. Those having ordinary skill in the art and access to the present teachings will recognize additional modifications, applications and embodiments within the scope thereof. Although the detailed description is directed to a PWM driven three-phase brushless reel motor, the current measuring system 100 of the present invention is equally applicable to other circuits that drive an inductive load with a PWM circuit such as a switching power supply.

It is therefore intended by the appended claims to cover any and all such modifications, applications and embodiments within the scope of the present invention.

Accordingly,

What is claimed is:

1. A system for measuring current drawn intermittently by an inductive load over a time interval T including a first and a second time subinterval during which said load is in state S1 and state S2 respectively and drawing current and a third time subinterval during which said load is in state S3, an idle state, and drawing substantially zero current, said current measuring system comprising:
    first means for detecting the average amplitude of said current drawn by said load while in said state S1 and said state S2 and providing a first signal in response thereto and
    second means for correcting said first signal to account for the idle state of said load to provide an output signal which represents the average current drawn by said load over said time interval T.

2. The invention of claim 1 wherein said first means includes means for detecting the amplitude of said load current during at least one of said subintervals at a midpoint thereof.

3. The invention of claim 2 wherein said means for detecting the amplitude of said load current during at least one of said subintervals at a midpoint thereof includes a sample and hold circuit for sampling said load current and holding the value thus sampled.

4. The invention of claim 3 wherein said means for detecting the amplitude of said load current during at least one of said subintervals at a midpoint thereof further includes timing means for activating said sample and hold circuit when said load current is at the midpoint in the range thereof during said one of said subintervals.

5. The invention of claim 4 wherein said at least one of said subintervals is said first subinterval.

6. The invention of claim 5 wherein said timing means for activating said sample and hold circuit when said load current is at the midpoint in the range thereof during said one of said subintervals includes first pulse width modulator means for generating a $\frac{1}{2}T_1$ timing signal.

7. The invention of claim 1 wherein said second means includes means for reducing said first signal by a scaling factor which compensates for the third time subinterval that the load is in said idle state.

8. The invention of claim 7 wherein said means for reducing said first signal by said scaling factor which compensates for the third time subinterval that the load is in said idle state includes means for determining the end of the second time subinterval, the beginning of the third time subinterval and the end of the third time subinterval.

9. The invention of claim 8 wherein said means for reducing said first signal by said factor which compensates for the third time subinterval that the load is in said idle state includes means for subtracting a duty cycle parameter $D_3$ equal to the percentage of time the load is in the idle state from the constant "1" to yield a scaling factor equal to $(1-D_3)$.

10. The invention of claim 9 wherein said means for reducing said first signal by said scaling factor which compensates for the third time subinterval that the load is in said idle state includes means for multiplying said first signal by said scaling factor $(1-D_3)$ to provide said output signal which represents the average current drawn by said load over said time interval T.

11. A circuit for signaling the transition between conduction and idle states of an amplifier comprising:
    means for monitoring a plurality of leads of an inductive load driven by said amplifier;
    means for controlling conduction of said monitoring means; and
    output means connected to said monitoring means for sensing a transition of an output signal between a first logic level and a second logic level.

12. The circuit of claim 11 wherein said monitoring means comprises a plurality of transistors.

13. The circuit of claim 11 wherein said controlling means comprises a voltage biasing source.

14. The circuit of claim 11 wherein said output sensing means comprises an output terminal.

15. A logic circuit for signaling the transition between conduction and idle states of a PWM amplifier comprising:
    input protection means for isolating a plurality of leads of a PWM amplifier driven inductive load from said logic circuit;
    a threshold comparator for monitoring said plurality of inductive load leads and for generating a logic signal to indicate the time of transition from a low logic signal to a high logic signal within said PWM amplifier;
    means for providing a fixed voltage to said threshold comparator to bias a plurality of circuit elements that monitor said plurality of leads; and
    means for providing an active load to said threshold comparator to minimize the time required to provide said logic signal to an output signal terminal.

16. The logic circuit of claim 15 wherein said input protection means comprises a first field effect transistor for controlling the passage of signals from said plurality of leads to said threshold comparator.

17. The logic circuit of claim 15 wherein said input protection means comprises a second field effect transistor for passing leakage current from a first field effect transistor to electrical ground for protecting said threshold comparator.

18. The logic circuit of claim 15 wherein said threshold comparator comprises a plurality of transistors communicating with said plurality of leads of said driven inductive load and with a common line, wherein the voltage potential on said plurality of leads determines the level of said logic signal on said common line.

19. The logic circuit of claim 15 wherein said means for providing a fixed voltage to said threshold comparator comprises a low voltage transistorized generator.

20. The logic circuit of claim 15 wherein said means for providing an active load to said threshold comparator comprises a buffer.

21. The logic circuit of claim 15 further including a latch for minimizing voltage oscillations at said output signal terminal during said idle state.

22. A method for measuring current drawn intermittently by an inductive load over a time interval T including a first and a second time subinterval during which said load is in state S1 and state S2 respectively and drawing current and a third time subinterval during which said load is in state S3, an idle state, and drawing substantially zero current, said current measuring method including the steps of:

detecting the average amplitude of said current drawn by said load while in said state S1 and said state S2 and providing a first signal in response thereto and correcting said first signal to account for the idle state of said load to provide an output signal which represents the average current drawn by said load over said time interval T.

* * * * *